(12) United States Patent
Zurutuza Elorza et al.

(10) Patent No.: US 9,023,220 B2
(45) Date of Patent: May 5, 2015

(54) METHOD OF MANUFACTURING A GRAPHENE MONOLAYER ON INSULATING SUBSTRATES

(71) Applicant: Graphenea, S.A., San Sebastian (ES)

(72) Inventors: Amaia Zurutuza Elorza, Pasaia (ES); Alba Centeno Perez, Donostia-San Sebastian (ES); Beatriz Alonso Rodriguez, Eibar (ES); Amaia Pesquera Rodriguez, Amorebieta (ES)

(73) Assignee: Graphenea, S.A., San Sebastian (Guipuzcoa) (ES)

( * ) Notice: Subject to any disclaimer, the term of this patent is extended or adjusted under 35 U.S.C. 154(b) by 0 days.

(21) Appl. No.: 13/931,063

(22) Filed: Jun. 28, 2013

(65) Prior Publication Data
US 2014/0001152 A1    Jan. 2, 2014

(30) Foreign Application Priority Data
Jun. 29, 2012    (EP) ..................... 12174322

(51) Int. Cl.
| | |
|---|---|
| C03C 15/00 | (2006.01) |
| C01B 31/04 | (2006.01) |
| B82Y 30/00 | (2011.01) |
| B82Y 40/00 | (2011.01) |

(52) U.S. Cl.
CPC ......... *C01B 31/0484* (2013.01); *C01B 31/0453* (2013.01); *C01B 2204/02* (2013.01); *B82Y 30/00* (2013.01); *B82Y 40/00* (2013.01)

(58) Field of Classification Search
USPC ..................... 216/36, 108; 428/220, 480, 688
See application file for complete search history.

(56) References Cited

U.S. PATENT DOCUMENTS

| | | | | |
|---|---|---|---|---|
| 2010/0021708 A1* | 1/2010 | Kong et al. | .................... | 428/220 |
| 2011/0033688 A1* | 2/2011 | Veerasamy | .................... | 428/220 |
| 2012/0258311 A1* | 10/2012 | Hong et al. | .................... | 428/408 |

OTHER PUBLICATIONS

Bae Sukang et al. Nature Nanotechnology, vol. 5, Aug. 2010, pp. 574-578.*

* cited by examiner

*Primary Examiner* — Duy Deo
*Assistant Examiner* — Maki Angadi
(74) *Attorney, Agent, or Firm* — Lucas & Mercanti, LLP

(57) ABSTRACT

A method of manufacturing a graphene monolayer on insulating substrates from CVD graphene synthesis, comprising:
applying a thermal release adhesive tape to the bottom graphene layer deposited at the bottom of the metal foil in the CVD graphene synthesis,
detaching the thermal release adhesive tape and the bottom graphene layer from the metal foil via the application of heat, from 1° C. up to 5° C. higher than the release temperature of the thermal release adhesive tape so that the thermal release adhesive tape with the bottom graphene layer can be removed, obtaining a metal foil with a top graphene layer sample, and
transferring the top graphene layer onto a substrate via a sacrificial protective layer.

7 Claims, 5 Drawing Sheets

METHOD OF MANUFACTURING A GRAPHENE MONOLAYER ON INSULATING SUBSTRATES

CROSS REFERENCE

This application claims priority from European Application No. EP12174322.3 filed Jun. 29, 2012 the content of which is incorporated by reference.

TECHNICAL FIELD

The invention relates to the field of graphene and in particular to the methods of manufacturing monolayers of graphene.

BACKGROUND

Graphene has attracted much attention since its discovery in 2004. Graphene is a one atom thick material composed of carbon atoms structured in a honeycomb hexagonal lattice. To put this in context we have to mention that the thickness of graphene is 0.345 nm, one million times thinner than an A4 piece of paper. Graphene's exotic properties such as high electronic mobility, extraordinary thermal conductivity, great strength, flexibility, and transparency make it an ideal candidate in many different applications. Graphene could have applications in electronics (high frequency devices, transistors, etc.), in energy (solar cells, batteries, supercapacitors, etc.), in touch screen and display technology (TV screens, mobile phones, etc.), in sensors and many more. As a consequence, the interest in graphene has increased exponentially in number of academic publications and patent applications.

Most of the applications foreseen for graphene will require a large-scale production of this material. At present, graphene can be manufactured using a variety of techniques and depending on the method the quality of the graphene obtained is very different. Graphene fabrication methods can be classified into two groups: the top down and the bottom up approach.

In the top down approach, graphene is prepared starting from graphite via the chemical or mechanical exfoliation of graphite. The chemical and mechanical exfoliation methods are suitable for the large-scale production of graphene flakes. The quality of the graphene produced is very low based on the electronic, thermal, strength, lateral dimensions, etc. The micromechanical exfoliated method used to isolate graphene for the first time in 2004 can also be classified in this top down approach. However, unlike the other two bulk production methods, this method leads to extremely small quantities of high quality micrometer scale monolayer graphene flakes. The main disadvantage of this technique is that it cannot be scalable to sizes that are large enough to be useful for industrial applications.

In the case of the bottom up approach the graphene is formed via the rearrangements of the carbon atoms in a Chemical Vapor Deposition (CVD) process. The sublimation of silicon from silicon carbide substrates can also be classified into this group. The only problem with this fabrication method is that the maximum graphene size that can be manufactured is limited by the substrate size that at present is at four-inch wafer scale. In addition the silicon carbide substrates are extremely expensive and would make graphene exceedingly expensive.

Large area graphene films have been manufactured using CVD methods. In 2010 a thirty-inch graphene film was manufactured for touch screen applications and published by Sukang Bae, et al, "Roll-to-roll production of 30-inch graphene films for transparent electrodes" in *Nature Nanotechnology* vol. 5, pg. 574-579, 2010.

The quality in terms of properties of the graphene produced via CVD is far superior to the graphene flakes produced using the bulk production methods.

In the CVD process graphene is deposited at relatively high temperatures between 600 and up to 1000° C. on a metal catalyst such as copper and nickel. Copper has been reported to control much better the deposition of monolayer graphene in comparison to nickel. The first publication of graphene growth on copper was reported in Science in 2009 by Xuesong Li et al, "Large-Area Synthesis of High-Quality and Uniform Graphene Films on Copper Foils" *Science* vol. 324, pg. 1312-1314, 2009 and in US patent US20110091647A1.

On the other hand graphene growth in nickel was reported at the beginning of 2009 in Nano Letters by Alfonso Reina et al, "Large Area, Few-Layer Graphene Films on Arbitrary Substrates by Chemical Vapor Deposition" in *Nano Letters* vol. 9, pg. 30-35, 2009 and in US patent US20100021708A1 where multilayer regions are quite abundant. During the CVD process the metal catalyst is exposed to a carbon source (solid, liquid or gas) at relatively high temperatures in order to deposit the graphene. Graphene deposition can be done close to atmospheric pressure conditions or under vacuum. The mechanism of the graphene formation can vary depending on the metal catalyst type. In the case of nickel catalysts graphene is primarily formed during the cooling down stage as a consequence of a precipitation process. The formation of graphene on copper occurs at elevated temperatures and it can be self-limiting up to some extend. As a result this surface reaction stops when the copper surface has been completely covered. A monolayer graphene coverage higher than 95% can be obtained on top of copper.

The copper catalyst can be in the form of thin films on top of silicon substrates or thicker films in the form of foils. In the case of the copper foils the graphene growth occurs at either side of the foil. As a consequence the bottom graphene layer has to be removed if monolayer graphene on insulating substrates is the required product.

The removal of one of the graphene layers has been reported using oxygen plasma etching in WO2012031238A2 and WO2012021677A2. This is the most common and reported method to eliminate the bottom graphene layer. However, the plasma etching method has a number of limitations:

Can end up damaging the top monolayer graphene layer (end product)
Not easily transferrable due to specific equipment dependency
Usually involves costly equipment
Not easy for inline integration, as a consequence could become the process bottleneck
Vacuum conditions required Therefore alternative methods are highly desired in order to overcome these shortcomings and enable large-scale manufacturing and transfer of graphene films to be applied in potential industrial applications.

WO2012031238A2 shows a transport step where the graphene is transferred from the copper foil onto silicon substrates using adhesive polymers. The impact on the uniformity of the final monolayer graphene produced using this transfer step is not presented. However, this transfer step can have a detrimental effect on the homogeneity, uniformity and in turn quality of the desired graphene layer. For the person skilled in the art this conclusion is pretty apparent especially in the case of large area graphene films. We must point out, however, that it is possible to satisfactorily transfer small areas (micrometer scale) of monolayer graphene using this technique. Similarly to the way graphene was initially discovered where a Scotch tape was used to transport the graphene from the starting graphite up to the final insulating substrate. Micrometer scale flakes were transferred without jeopardizing the homogeneity, uniformity and quality of the graphene flake.

In the same line of thought, if stamping techniques are used to transport graphene onto insulating substrates they could potentially damage it. Polydimethylsiloxane (PDMS) stamps have been used only to transfer relatively small areas of monolayer graphene as published in WO20122021677A2. However for a person skilled in the art of graphene transfer processes it is quite evident that this method can have scale-up issues in order to transfer large graphene films. In other words, if the complete transfer of small films is not possible then the full transfer of larger films would be less likely.

DESCRIPTION

The invention refers to a method of manufacturing monolayer graphene that can aid the large-scale production of graphene for industrial applications and in turn secure the future of graphene in marketed products, using thermal release adhesive polymer tapes to eliminate the bottom or unwanted graphene layer after a CVD process on cooper foils.

The properties of monolayer high quality graphene could open up the industrial application of this material in many different fields. However, large area high quality graphene is not easy to produce and manipulate. Graphene being a one atom thick material (one million times thinner than an A4 piece of paper) makes the handling of this nanostructure extremely challenging and difficult. The probability of damaging the graphene during processing is pretty high. Therefore, processing steps have to be carefully selected in order to minimize the impact on the final properties of the graphene.

CVD has emerged as the method of choice for large area production of monolayer graphene. The use of CVD in combination with copper catalysts has enabled the relatively large-scale production of monolayer graphene. However, the graphene synthesis is only the first step since it has to be transferred onto insulating substrates for characterization and device fabrication to render it useful for potential applications.

The CVD reaction can be undertaken using different types of CVD equipment such as cold walled and hot walled reactors. During the deposition process a carbon source solid, liquid or gas is inserted into the reactor chamber. At high temperatures between 600 and up to 1100° C. graphene is formed on the copper catalyst surface. This process can be done at atmospheric pressure or under vacuum. The addition of plasma during graphene growth can also be an option if growth at lower temperatures is desired.

Graphene can be grown on top of thin copper films on silicon substrates or copper foils. Among the advantages of the copper foils are their very low cost, flexibility and easy handling. Graphene can be deposited on copper foils of varying thicknesses ranging from 10 μm up to 1000 μm. Graphene typically grows on both sides of the copper foil and as a consequence one of the graphene layers has to be eliminated if you do not want to have unwanted large areas of bilayer graphene. Once the bottom or unwanted graphene layer is eliminated the desired graphene layer is ready to be transferred onto arbitrary or insulating substrates.

The method of manufacturing a monolayer of graphene on arbitrary insulating substrates from CVD graphene synthesis, wherein a metal foil catalyst with a top graphene layer and a bottom graphene layer is obtained, on present invention, comprises the steps of:

Apply an adhesive tape to the bottom graphene layer deposited at the bottom of the metal foil, using at least a roller to apply controlled pressure and speed, starting from one edge of the adhesive tape to the opposite edge, thus avoiding the formation of bubbles between the copper foil and the adhesive tape, at room temperature without the need to use a controlled atmosphere. These adhesive tapes can be thermal or pressure sensitive tapes but preferably thermal release tapes. The thermal release adhesive tapes can be polymeric. The composition of the adhesive polymer can be based in polyester type polymers such as polyvinyl acetate, polyethylene vinyl acetate, polyacrylates (polymethyl acrylate, polyethyl acrylate, polypropyl acrylate, polybutyl acrylate, etc.), polymethacrylates (polymethyl methacrylate, polyethyl methacrylate, polypropyl methacrylate, polybutyl methacrylate, polyhydroxyethyl methacrylate, etc.) etc.

Detaching the adhesive polymer and the bottom graphene layer from the copper foil via the application of heat, from 1° C. up to 5° C. higher than the release temperature of the adhesive tape so that the adhesive layer with the bottom graphene layer can be removed, obtaining a metal foil with a top graphene layer sample, and A final standard transfer process step of the top graphene layer onto a substrate, comprising the steps of:
  Coating the metal foil with the top graphene layer with a sacrificial protective layer,
  Then, the metal foil catalyst is etched, resulting a film consisting of the sacrificial protective layer with the top graphene layer, then
  The top graphene layer with the sacrificial protective layer is transferred onto the desired substrate, and
  In a final step, the sacrificial protective layer is removed via dissolution or thermal treatment.

The use of cited adhesive polymers for the elimination of one of the graphene layers is not at all intuitive as these tapes have been used in the roll to roll transfer of graphene. In this roll to roll transfer of graphene the thermal release adhesive polymer is used to aid the graphene transfer onto insulating substrates rather than to the elimination of the graphene layer. However, to our surprise we discovered that this polymer tape could be applied instead of tedious plasma methods for the removal of the unwanted graphene layer. In addition, the quality of the graphene produced using this method was far superior to the quality of the graphene obtained using oxygen plasma etching methods. Moreover, the bottom graphene layer is completely eliminated using our method and there are no bottom layer residues left on the desired monolayer graphene product.

In addition these adhesive tapes are used to manipulate other materials such as silicon wafers. Temporary bonding techniques such as thermal release tapes are used to ensure the secure handling and processing of thin and fragile semiconductor substrates. In the case of the silicon wafers these tapes do not damage the silicon material that they are transporting mainly because they are not atomically thin. However the case of graphene is quite atypical due to its extreme thinness. The atomic thickness of graphene makes it very difficult to manipulate and prone to damage. Nevertheless it is not intuitive the use of adhesive tapes to eliminate graphene, it is more instinctive to use them as the transport media.

Herein we propose to use adhesive tapes to eliminate the unwanted graphene layer rather than to manipulate and transport the desired graphene layer. To the best of our knowledge it is the first time that this novel idea has been proposed.

In addition this method is scalable to accommodate large graphene films. In principle there is no maximum limit in the graphene size rather than the one given by the equipment used to attach the adhesive tape and the equipment used to produce the graphene. The equipment could be defined to be able to handle meter scale graphene films. Furthermore, this method can be easily integrated in an in-line, continuous or batch production process, making graphene industrial production viable. Thus, opening up the opportunity to market graphene based products.

The application of the adhesive tape is done at room temperature without the need to use a controlled atmosphere. Moreover, this method does not require sophisticated equipment or vacuum conditions for its implementation. Bulk standard equipment that can apply controlled pressure with a controlled speed is sufficient. The equipment is low cost; even a hand-operated process can be possible.

The most important advantage of the current invention is that it ensures the highest quality of the transferred monolayer graphene. Oxygen plasma methods can easily damage the desired graphene layer introducing functional groups or point defects and deteriorating the unique properties of the graphene film.

Once the thermal release adhesive tape has been applied using a simple pressure and speed controlled machine, the unwanted graphene layer along with the tape can be removed via the application of heat. As soon as the bottom graphene layer has been removed, the top graphene layer can be transferred onto arbitrary substrates using standard transfer processes. In order to carry out this transfer process, the desired graphene layer is first protected with a sacrificial layer material prior to the etching of the catalyst. Once the catalyst has been etched the graphene can be placed onto the final substrate. In the final step the sacrificial layer is removed via dissolution in suitable solvents or thermal degradation. Hence the final product graphene is obtained on top of insulating or arbitrary substrates.

When the monolayer graphene is on top of suitable substrates such as silicon wafers with a 300 nm thermal oxide layer, it can be characterized using various techniques. The quality of the graphene film is analyzed using Raman spectroscopy while the uniformity and homogeneity can be assessed using optical microscopy techniques.

The graphene produced using the process described in this invention has very high quality, homogeneity and uniformity, as it will be demonstrated throughout this document.

It is apparent that the process of eliminating one of the graphene layers has to be gentle enough to avoid damaging the desired graphene layer. The process described in this document exactly achieves this objective since ensures the quality of the final graphene remains intact. In order to eliminate the unwanted graphene layer we apply a commercially available adhesive polymer using low cost quite standardized equipment.

BRIEF DESCRIPTION OF THE DRAWINGS

The description of the different components of the system provided above is complemented with a drawing aimed at facilitating understanding of its structure and operation.

DETAILED DESCRIPTION OF THE INVENTION

Figure 1:
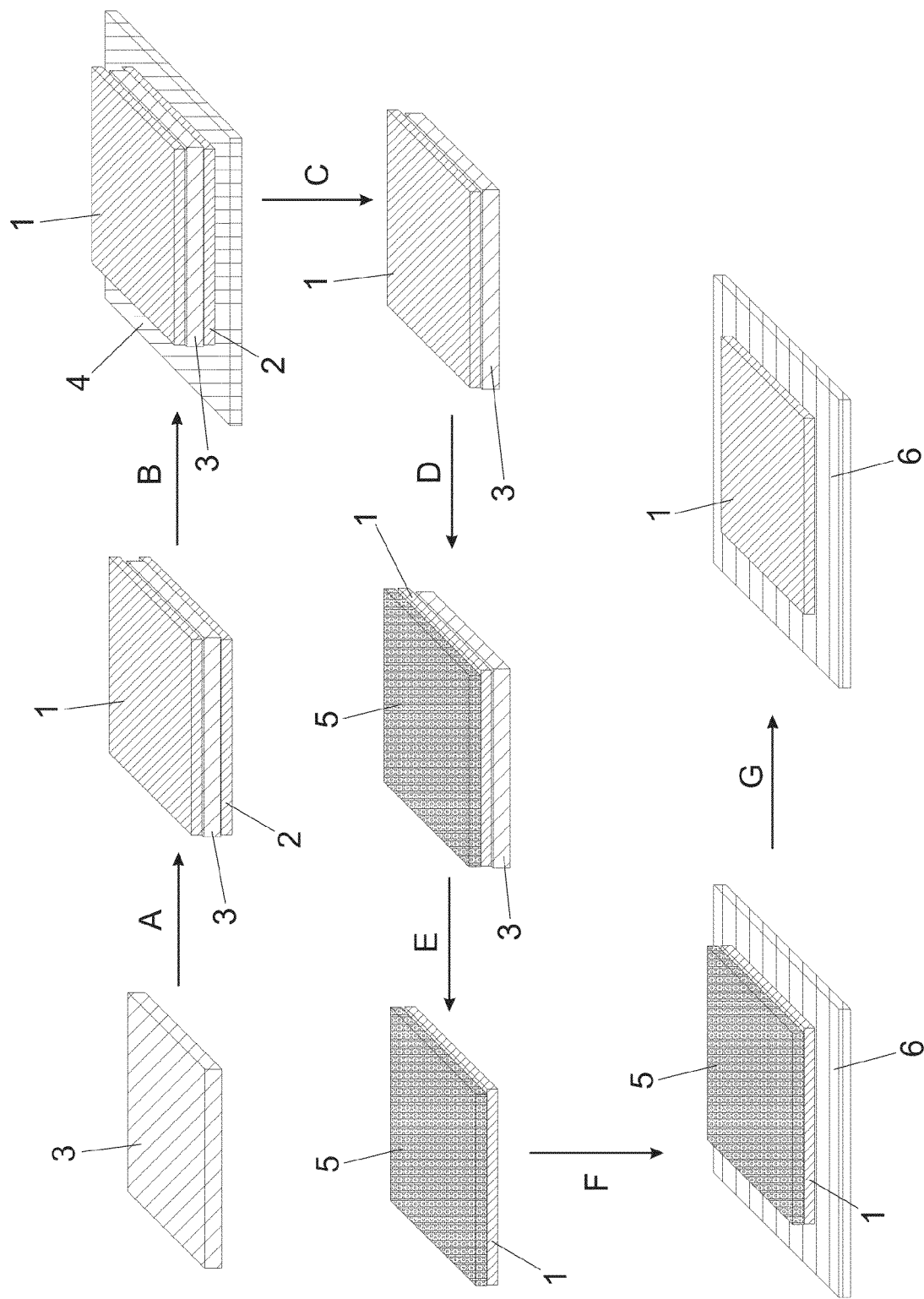
FIG. 1 shows the steps of the process.
Figure 2:
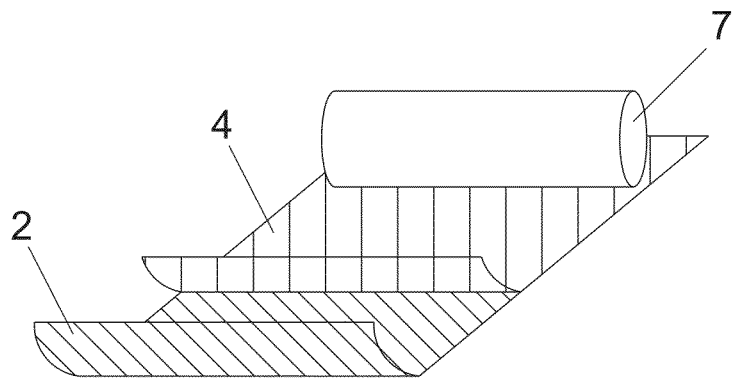
FIG. 2 shows a detail of step B of FIG. 1.

The different steps involved in the synthesis and transfer of monolayer graphene are shown in FIG. 1. Briefly:

the process starts from a graphene growth via a CVD process (A), in which it is obtained graphene on copper foil (3), monolayer graphene being at either side of the foil, top (1) and bottom (2).

an elimination step of the bottom graphene monolayer follows the CVD process (A), by:
applying thermal release adhesive polymer (4) onto the bottom graphene layer (2), shown in step B of FIG. 1 and in FIG. 2, using a pressure and speed controlled roller (7) in order to apply it starting from one edge of the adhesive polymer to the opposite edge, thus avoiding the formation of bubbles between the copper foil (3) and the adhesive tape (4), and
detaching the adhesive polymer (4) and the bottom graphene layer (2) from the copper foil (3) via the application of heat (step C). The temperature has to be from 1 up to 5° C. higher than the release temperature of the tape. As soon as the adhesive tape/bottom graphene/Cu foil/top graphene is placed on a hot plate that has been set to the right temperature to release the tape, the tape/bottom graphene detach almost instantly, so that the foil/top graphene is ready to be transferred using a standard transfer process.

A standard transfer process step (steps D, E, F and G) of the metal foil (3)/top graphene layer (1) sample onto a substrate (6), comprising the steps of:
coating, as shown in step D, the metal foil/graphene layer sample with a sacrificial protective layer such as polymethyl methacrylate (PMMA) in order to etch the copper catalyst.
Then, the metal foil catalyst is etched, as shown in step E, by emerging the sample in an aqueous ferric chloride solution.
When the etching is complete the graphene is washed thoroughly with distilled water and a number of different solutions (acidic, organic, etc). The PMMA/graphene film is then deposited onto the desired substrate as shown in step F.
In the final step, the PMMA layer is removed via dissolution or thermal treatment as shown in step G.

The application of the adhesive polymer (4) is a critical step in order to ensure the complete elimination of the bottom graphene layer (2) and in turn the quality of the desired top graphene layer (1).

Figure 3:
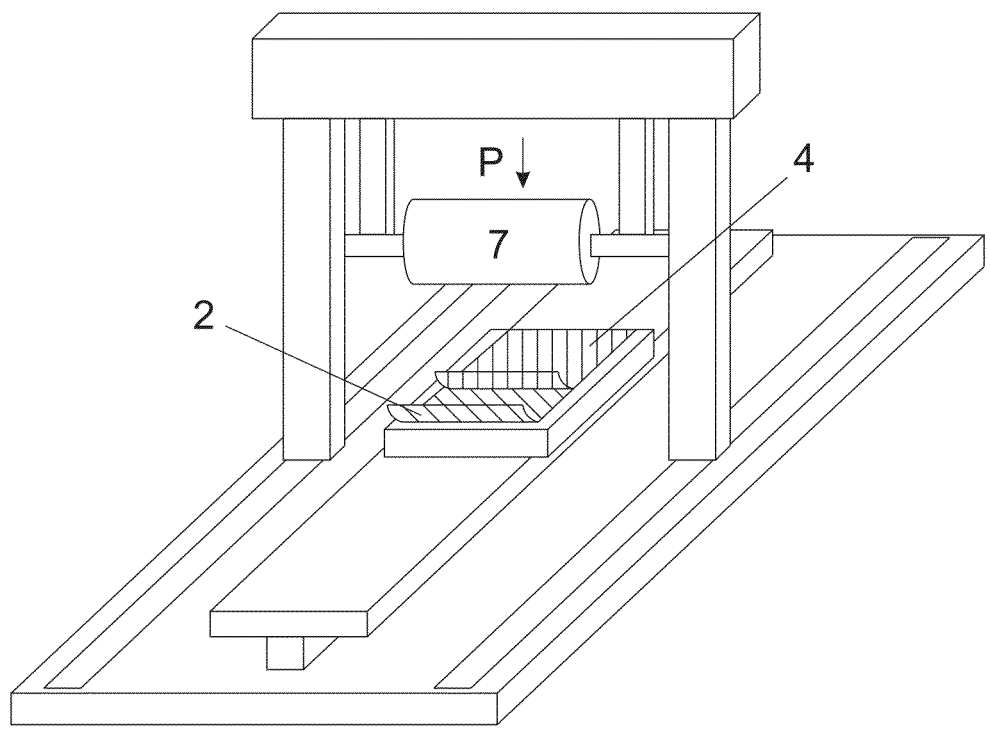
FIG. 3 shows a perspective of a machine with a roller to apply the adhesive polymer.

The thermal release tape can be applied by a specific machine as shown in FIG. 3, that enables the application of the adhesive tape on the graphene bottom layer (bottom graphene layer/Cu foil/top graphene layer) instead of doing it by hand, using a controlled pressure and speed by a roller in order to avoid the formation of bubbles between the bottom graphene/Cu foil and the adhesive tape. The equipment is basically composed of a stainless steel sheet, where the material is placed, and a rubber roller that allows the sticking of the adhesive tape onto the graphene bottom layer. The pressure is controlled by means of a pneumatic cylinder and accuracy valves.

The equipment has two working functions: (1) displacement of the roller through the sample keeping the sheet fixed and (2) displacement of the sheet keeping the roller fixed. The displacement speeds of both components can be well controlled.

The pressures that can be applied range from 0.1 up to 8 bar. The pressure is applied from 1 up to 240 seconds depending on the dimensions of the graphene layer. A temperature controlled environment is not necessary, it works at room temperature and outside a cleanroom environment. At the same time this machine improves the bonding strength and adhesion between the bottom graphene/Cu foil and the adhesive polymer avoiding also the formation of bubbles between the two layers. In principle meter scale graphene layers could be handled using this type of equipment.

The adhesive layer along with the graphene bottom layer is lifted off when the sample is deposited on a hot plate and exposed to a temperature between 1 and 20° C. above the release temperature of the tape. The applied temperature ideally should be between 1 and 5° C. above the release temperature of the adhesive polymer.

Once the graphene is on the desired substrate the quality and uniformity can be assessed. The uniformity and homogeneity of the graphene can be evaluated using optical microscopy techniques when the graphene has been transferred onto silicon substrates that contain a 300 nm thermal oxide layer (Si/SiO$_2$ 300 nm). On the other hand, the graphene quality can be determined using Raman spectroscopic techniques on the same substrates (Si/SiO$_2$).

In the following examples the high uniformity, homogeneity and quality of the monolayer graphene produced using the above described process will be shown.

EXAMPLES

Example 1

Commercial adhesive polymer that releases at 90° C. (example: Revalpha, Nitto Denko with adhesive strength 2.5 N/20 mm, thermal release temperature 90° C.) was used to remove the undesired bottom layer from a copper foil of 1 cm$^2$ with graphene grown at either side of the foil.

Two separate experiments were carried out:
a) In the first experiment, a pressure of 0.5 bar was applied on the adhesive polymer to attach it onto the bottom graphene/copper foil using the previously described equipment (FIG. 3) that has a rubber roller component in order to apply the pressure. The rubber roller cylinder was moved at 1 cm/sec starting from one edge of the adhesive polymer to the opposite edge, thus avoiding the formation of bubbles between the copper foil and the adhesive tape.
b) In the second experiment, the same pressure was applied evenly at the same time on the whole surface of the adhesive tape.

The adhesive layer along with the graphene bottom layer was lifted off at 95° C. using a hot plate for heating.

After etching the copper and removing the PMMA, the uniformity and homogeneity of the desired monolayer graphene was evaluated using optical microscopy. The graphene was transferred onto Si/SiO$_2$ substrates.

Figure 5:
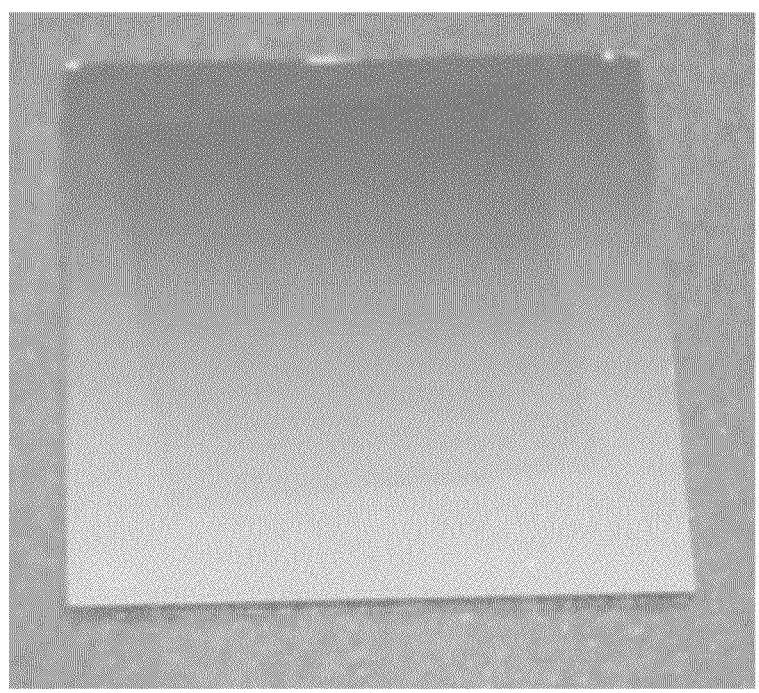
FIG. 5 shows a picture of first experiment of example 1.
Figure 6:
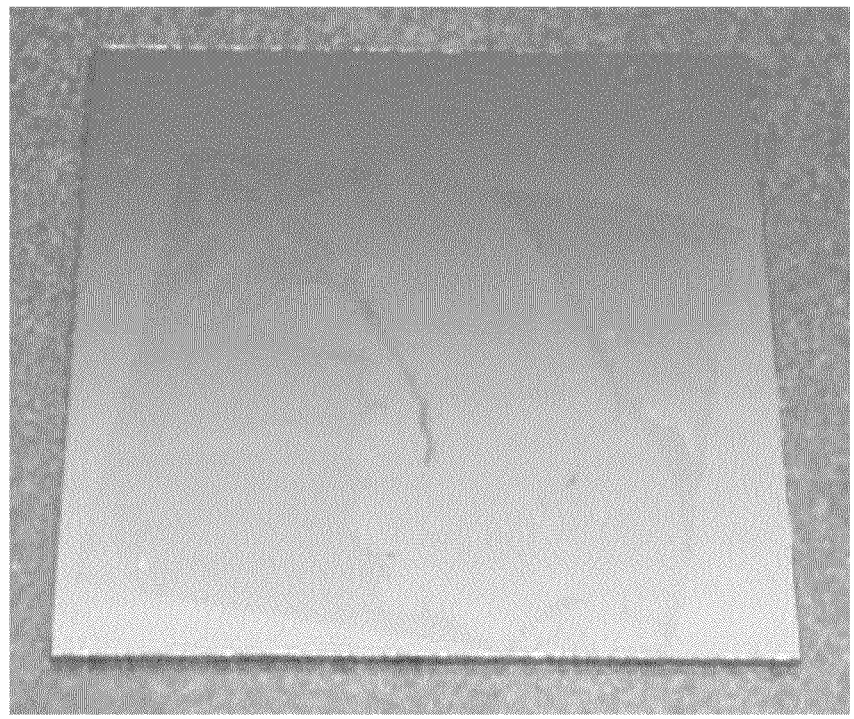
FIG. 6 shows a picture of second experiment of example 1.

It can be observed that the bottom layer has been completely eliminated in the case of the first experiment and that the remaining graphene film is composed of only monolayer graphene (FIG. 5). On the other hand, in the second experiment the bottom layer clearly remains in the final graphene film (FIG. 6) along with the top graphene layer. Therefore the final product is not composed of a graphene monolayer.

In conclusion, the importance of this roller component in order to apply the adhesive polymer has been clearly demonstrated.

Figure 4:
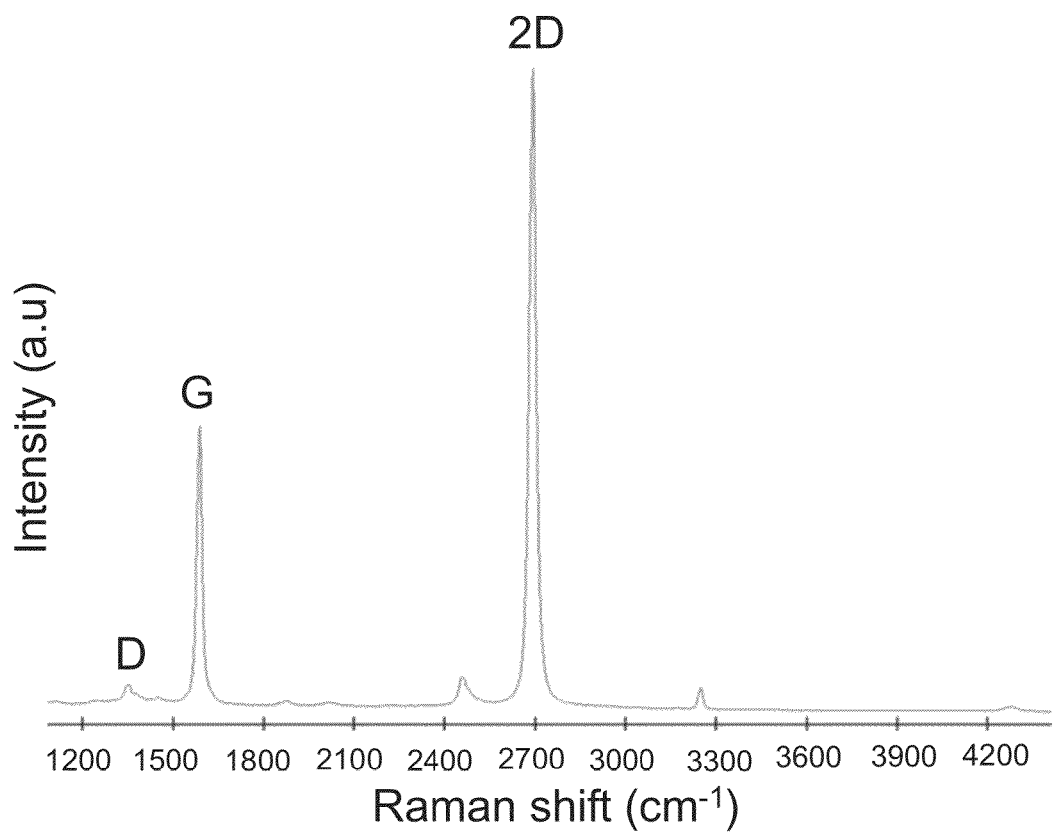
FIG. 4 shows the Raman spectrum of example 1.

The quality of the graphene produced using the conditions of the first experiment was assessed using Raman spectroscopy, FIG. 4, in which it can be observed that high quality graphene was obtained at the end of the process.

Briefly, the 2D peak is single Lorentzian and with a full width at half maximum of 25 cm$^{-1}$. The intensity of the G/2D peaks is 0.43 indicating the presence of monolayer graphene. The so-called D peak that indicates the presence of defects is not present emphasizing the high quality of the graphene obtained.

Example 2

Commercial adhesive polymer that detaches at 150° C. (example: Revalpha, Nitto Denko with adhesive strength 3.7 N/20 mm, thermal release temperature 150° C.) was used to remove the undesired bottom layer from a copper foil of 125 cm$^2$ with graphene grown at either side of the foil.

Two separate experiments were carried out:
a) In the first experiment, a pressure of 1.0 bar was applied on the adhesive polymer to attach it onto the bottom graphene/copper foil using the previously described equipment (FIG. 3) that has a rubber roller component in order to apply the pressure. The rubber roller cylinder was moved at 1 cm/sec starting from one edge of the adhesive polymer to the opposite edge, thus avoiding the formation of bubbles between the copper foil and the adhesive tape.
b) In the second experiment, the same pressure was applied evenly at the same time on the whole surface of the adhesive tape.

The adhesive layer along with the graphene bottom layer was lifted off at 155° C. using a hot plate for heating.

After etching the copper and removing the PMMA, the uniformity and homogeneity of the desired monolayer graphene was evaluated using optical microscopy. The graphene was transferred onto Si/SiO$_2$ substrates.

Figure 8:
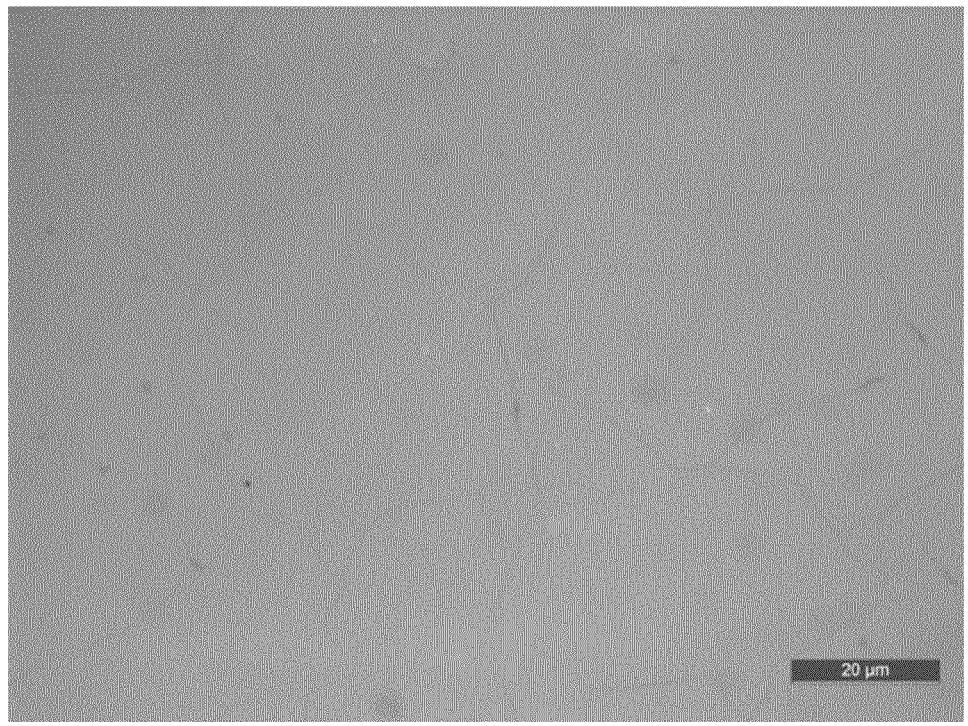
FIG. 8 shows a picture of first experiment of example 2
Figure 9:
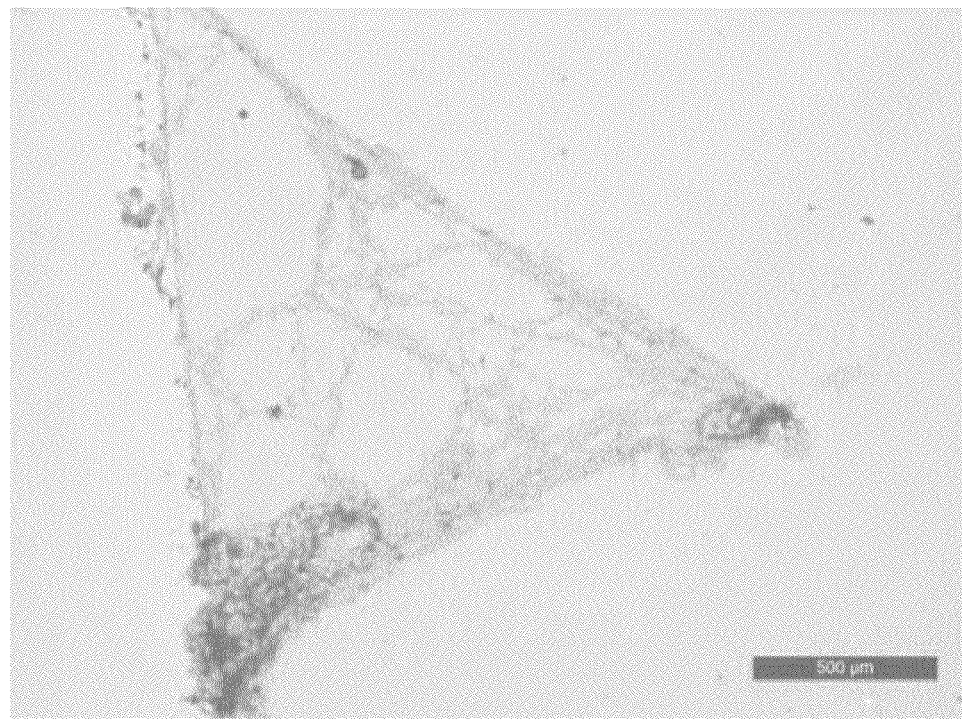
FIG. 9 shows a picture of second experiment of example 2.
In said figures the following references are indicated:
1.—Top graphene layer
2.—Bottom graphene layer
3.—Metal foil
4.—Adhesive polymer
5.—PMMA
6.—Substrate
7.—Roller

It can be observed that the bottom layer has been completely eliminated in the case of the first experiment and that the remaining graphene film is composed of only monolayer graphene (FIG. 8). On the other hand, in the second experiment the bottom layer clearly remains in the final graphene film (FIG. 9) along with the top graphene layer. Therefore, the final product is not monolayer graphene.

Again the importance of the roller component in order to apply the adhesive polymer onto the bottom graphene/copper foil was confirmed.

The quality of the graphene produced using the conditions of the first experiment was assessed using Raman spectroscopy.

Figure 7:
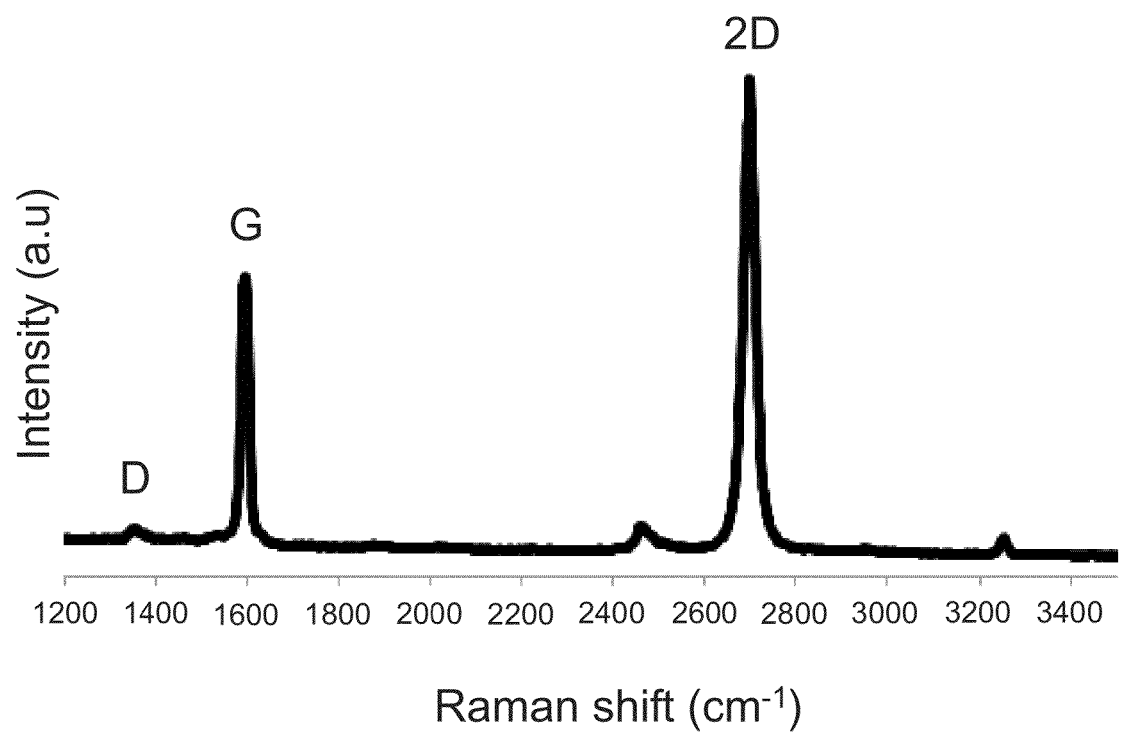
FIG. 7 shows the Raman spectrum of example 2.

It can be observed in FIG. 7 that high quality graphene was obtained at the end of the process where the adhesive polymer was applied using the roller technique.

Briefly, the 2D peak is single Lorentzian and with a full width at half maximum of 28 cm$^{-1}$. The intensity of the G/2D peaks is 0.56 indicating the presence of monolayer graphene. There is no D peak emphasizing its high quality.

The invention claimed is:

1. A method of manufacturing a graphene monolayer on insulating substrates from Chemical Vapor Deposition graphene synthesis, wherein a metal foil catalyst with a top graphene layer and a bottom graphene layer is obtained, comprising:
   applying a thermal release adhesive tape to the bottom graphene layer deposited at the bottom of the metal foil in the Chemical Vapor Deposition graphene synthesis, by at least a roller from one edge of the thermal release adhesive tape to the opposite edge, so that it allows the sticking of the thermal release adhesive tape onto the graphene bottom layer;
   detaching the thermal release adhesive tape and the bottom graphene layer from the metal foil via the application of heat, from 1° C. up to 5° C. higher than the release temperature of the thermal release adhesive tape so that the thermal release adhesive tape with the bottom graphene layer can be removed, obtaining a metal foil with a top graphene layer sample; and
   transferring the top graphene layer onto a substrate via a sacrificial protective layer.

2. The Method according to claim 1, wherein the transfer step of the top graphene layer onto a substrate, comprises:
   coating the metal foil with the top graphene layer sample with a sacrificial protective layer;
   etching the metal foil catalyst resulting a film consisting of the sacrificial protective layer with the top graphene layer;
   depositing the top graphene layer with the sacrificial protective layer onto the desired substrate; and
   removing the sacrificial protective layer via dissolution or thermal treatment.

3. The Method according to claim 1, wherein the thermal release adhesive tape releases at 90° C.

4. The Method according to claim 1, wherein the thermal release adhesive tape detaches at 150° C.

5. The Method according to claim 1, wherein the thermal release adhesive tape is an adhesive polymer based on polyester selected from the group consisting of polyvinyl acetate, polyethylene vinyl acetate, polyacrylates, and polymethacrylates.

6. The Method according to claim 1, wherein the application of the thermal release adhesive tape on the graphene bottom layer is done by a roller with controlling pressure and speed means.

7. The Method according to claim 6, wherein the controlling pressure and speed means are pneumatic cylinders and accuracy valves.

* * * * *